Patented May 31, 1949

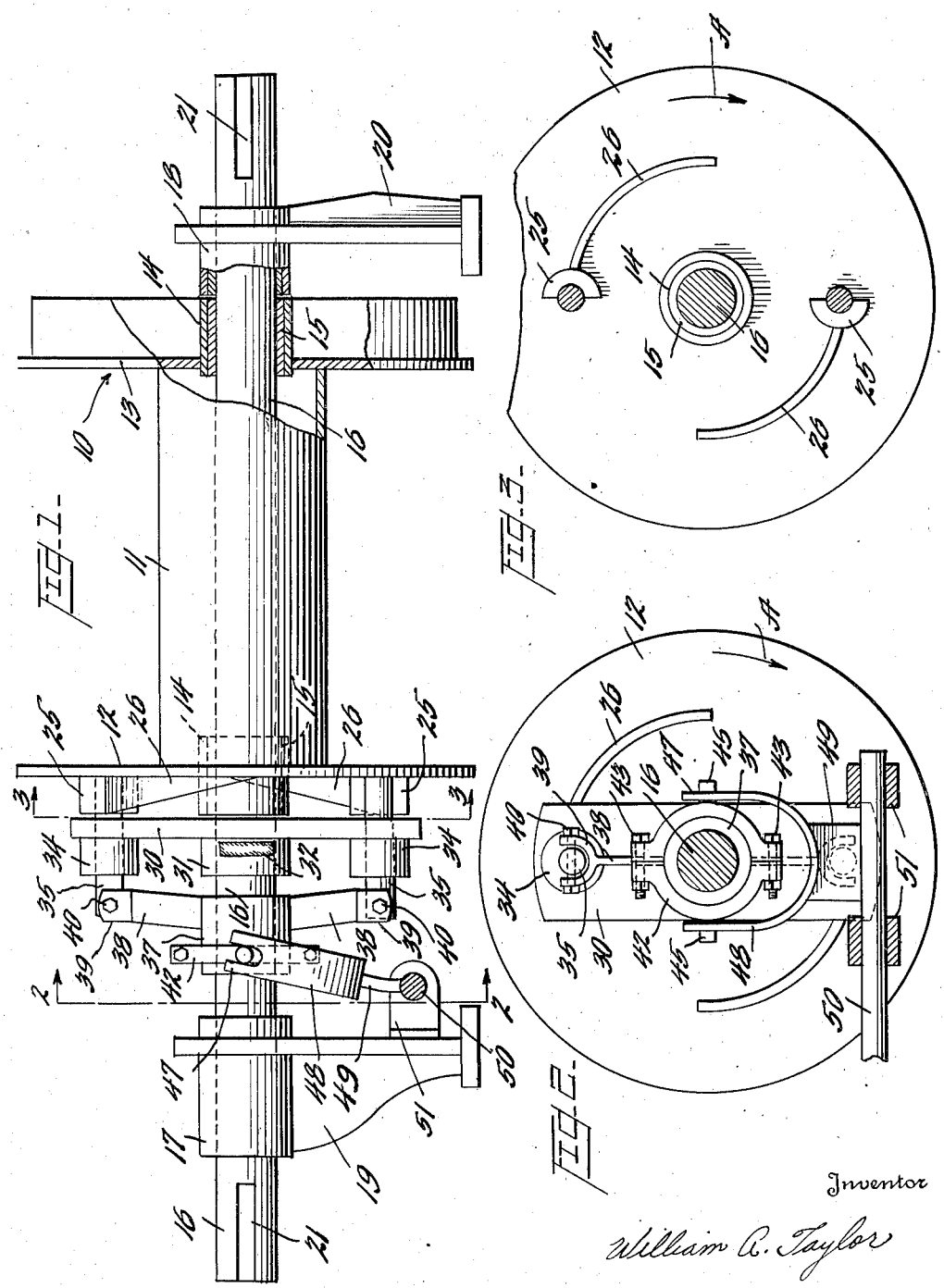

2,471,795

UNITED STATES PATENT OFFICE 2,471,795

ONE-WAY CLUTCH OF THE PIN AND SOCKET TYPE

William A. Taylor, Louisville, Miss.

Application August 26, 1946, Serial No. 693,051

3 Claims. (Cl. 192—47)

This invention relates to clutches and more particularly to positively acting clutches of the type especially adapted for transmitting driving force from a rotatable axle or shaft to a drum or reel carried thereby.

The general object of the invention is the provision of a novel and improved clutch of this type which is of rugged and simple construction, economical to manufacture and maintain, capable of positive action with no danger of slippage and not subject to injury or obstruction by oil, dirt, grease, or water.

In its preferred embodiment the invention contemplates the provision of a disc rotatable on a drive shaft, the disc being the driven element of the clutch and comprising a rigid portion of a gear, pulley, drum or reel, or any other member to which power is to be applied from the shaft. The driving portion of the clutch assembly comprises a drive member fixed to the shaft, extending in a plane transverse thereto, and provided with guide openings for the projectible pin or bolt elements of the clutch. A pin-carrier is slidably mounted on the shaft and the clutch pins are pivotally mounted upon radially extended portions thereof. The engagement of the pins within the openings in the drive member fixed to the shaft, causes the pin-carrier to rotate with the shaft although it is also slidable relative thereto. The pin-carrier is adapted to be engaged by a shifting yoke whereby the carrier and, therefore, the pin elements, may be projected through the drive member and into engagement with the driven element of the clutch assembly.

The driven disc is provided with novel socket portions within which the pins are adapted to be projected, and means are also provided for strengthening and reinforcing the disc and socket structure and for disengaging the pins from the disc upon reverse movement of the latter.

Other objects and features of novelty will be apparent from the following specification when read in connection with the accompanying drawings in which one embodiment of the invention is illustrated by way of example.

In the drawings:

Figure 1 is a view in elevation of a drive for a winding drum which embodies a clutch constructed and operated in accordance with the principles of the invention, a portion of the winding drum being shown in section;

Figure 2 is a transverse vertical sectional view taken on line 2—2 of Figure 1; and Figure 3 is a similar view taken on line 3—3 of Figure 1.

In the embodiment illustrated in the drawings, the invention is applied to a winding drum or reel, but it is understood that such illustration is for example only and the novel clutch may be applied to any type of driven element which is adapted to be operatively linked to a drive shaft. The drum or reel indicated generally by the reference numeral 10 comprises a cylindrical drum core 11 to the ends of which are connected, as by means of welding, the end plates 12 and 13. Centrally of the end plates there are provided cylindrical drum bushing carriers 14 which may be welded or otherwise secured within central openings in the end plates 12 and 13. Within the bushing carriers 14 there are disposed the bearing bushings 15 by means of which the drum or reel 10 is rotatably mounted upon the drive shaft 16.

The drive shaft 16 is mounted in the bearings 17 and 18 which are supported by the pedestals 19 and 20. The shaft is adapted to be rotated from any suitable source of power and for this purpose the shaft is provided with the key or spline slots 21 adjacent its ends.

The end plate or disc 12 comprises the driven member of the clutch assembly, and, of course, within the broadest scope of the invention, this disc or driven member may be a part of any type of driven device carried by the shaft, whether a pulley, drum, gear, or the like. Means are provided on the outer face of the disc 12 for engagement by the movable pin elements. These means comprise the semi-cylindrical socket elements 25 which are welded or otherwise secured at diametrically opposite points on the outer face of the disc. In order to brace and reinforce these sockets elements, and to serve a purpose which will be described later, there are provided arcuate wedge or cam-like plates or ribs 26 welded to the face of the disc 12 and abutting the socket elements 25.

At a point adjacent the position of the end disc 12 of the drum, upon the drive shaft 16, there is fixed to the shaft a transversely extending drive member 30, which in the illustrated embodiment, comprises a sturdy bar or plate provided with a central opening through which the shaft extends. A flange 31 surrounds the shaft and is welded to both the bar 30 and the shaft 16. In order to further rigidify the shaft and drive member 30 the flange 31 is provided with a rectangular opening 32 to provide additional welding surface between the shaft and the flange.

Adjacent the ends of the drive bar 30, there are provided openings around which are fixed the tubular or cylindrical sleeves or collars 34 which provide additional guiding support for the projectible pin or bolt elements 35.

Slidably mounted on the drive shaft 16 between the drive bar 30 and the bearing 17 is the collar 37 which is provided with the oppositely extending rigid arms 38 which are forked at the ends as at 39 to embrace the pins 35, bolts 40 providing pivots for the locking pins 35. The collar 37 is circumferentially grooved adjacent its lefthand end as viewed in Figure 1 and within this groove is clamped the split ring 42, the two halves of which are secured together as by means of the bolts 43. Ring 42 is provided with projecting trunnions 45 which are embraced by the slotted ends 47 of the U-shaped shift yoke 48. The shift yoke is provided at its bend with a plate 49 which is secured to the actuating shaft 50 which may be carried in suitable bearings 51.

In actuating the clutch, the rod or shaft 50 is rocked in one direction or the other, whereupon the shift yoke 48 moves the shifting member or pin-carrier 37 upon the shaft 16, the connection between the split ring 42 and the member 37 permitting the latter to rotate with the shaft while being adjustable longitudinally thereon. When the pin-carrier 37 is moved toward the left in Figure 1, the pins 35 are moved in the same direction through the guide openings in the drive bar 30 and are retracted from the socket elements 25 on the driven disc 12, whereupon the reel or drum 10 is disconnected from the shaft 16. When the pin-carrier 37 is moved toward the right in Figure 1 by the appropriate rocking of the shaft 50, the pins 35 are projected from the openings in the drive member 30 so that they will engage in the semi-cylindrical sockets 25 and serve to rotate the driven disc 12, and the reel of which it is a part, in the direction of the arrow A in Figures 2 and 3 of the drawings.

A further function of the inclined bracing elements 26 associated with the sockets 25 will now be described. These elements are in effect cam members which, if the shaft 16 were to rotate in a direction opposite to the arrow A, would cam the pins 35 out of engagement with and reverse the movement of the clutch actuating members. A similar result would occur if the reel 10 were to overrun the driving member 30 and the shaft 16 in the direction of the arrow A.

Various changes and modifications may be made in the embodiments illustrated and described herein without departing from the scope of the invention as defined by the following claims.

Having thus described the invention, what is claimed as new and desired to be secured by Letters Patent is:

1. In a transmission of the class described, in combination, a drive shaft, a driven disc element mounted for rotation on said shaft, clutch means for effecting and disengaging a driving connection between said shaft and said driven disc element, said means comprising a drive bar welded to the shaft adjacent said disc element and extending transversely of the shaft, said drive bar having openings therethrough one on each side of the axis of said shaft, a pin-carrying member slidably mounted directly upon said shaft, said pin-carrying member comprising a hub and a pair of diametrically extending arms, pivots carried by the ends of said arms, said pivots extending transversely with respect to the axis of said shaft, one or more projectible pins carried by said pivots and guided within the openings in said drive bar for projection toward and retraction from said disc element, sockets in said driven disc element for reception of said pin elements when the clutch is engaged, and a shifting yoke operatively connected with said pin-carrying member for projection and retraction of the pin elements through said drive bar and into and from engagement with said sockets.

2. In a transmission of the class described, in combination, a drive shaft, a driven element mounted for rotation on said shaft, clutch means for effecting and disengaging a driving connection between said shaft and said driven element, said means comprising a drive member fixed to the shaft adjacent said driven element and extending transversely of the shaft, said drive bar having openings therethrough one on each side of the axis of said shaft, a pin-carrying member slidably mounted on said shaft, one or more projectible pins carried by said pin-carrying member and guided within the openings in said drive member for projection toward and retraction from said driven element, isolated circumferentially-spaced protuberances on said driven element extending toward said pin-carrying member and recessed both outwardly toward the pin-carrying member and rearwardly considering the direction of rotation of said protuberances as the driven element turns, whereby said pins may engage said protuberances within the recesses for forward driving movement but disengage therefrom upon reversal of movement of said pin-carrying member or upon overrunning of the driven element, and a shifting yoke operatively connected with said pin-carrying member for projection and retraction of the pin elements through said drive member and into and from engagement with said protuberances, and narrow arcuate inclined cam-like ribs projecting from the surface of said driven member, having their higher ends abutting the forward sides of the respective protuberances for bracing and reinforcing the latter and also providing means for abutting the ends of said pins during a portion of their circular movement and for throwing the pins out of engagement with the driven element upon reversal of the rotation of the pin-carrying member or upon overrunning of the driven element.

3. In a pin-clutch transmission of the class described, the sub-combination of a driven member comprising a circular disc element carried by an axially disposed shaft and adapted to be engaged at will by the pins of the driving member of the clutch, one or more projecting, substantially semi-cylindrical, socket elements welded to that surface of said disc element which faces the driving member, said socket elements adapted to open endwise toward said driving member and circumferentially toward the respective pins, and one or more narrow arcuate cam-like bracing ribs each welded both to the surface of said disc element and to the convex outer wall of one of said socket elements, for bracing and reinforcing the latter and also providing means adapted to abut the ends of said pins during a portion of their circular movement and adapted to throw the pins out of engaging position with respect to the driven element upon reversal of the direction of relative rotation of the driving and driven members, as for example upon overrunning of the driven member.

WILLIAM A. TAYLOR.

REFERENCES CITED

The following references are of record in the file of this patent:

UNITED STATES PATENTS

| Number | Name | Date |
| --- | --- | --- |
| 355,267 | Higgins | Dec. 28, 1886 |
| 796,205 | Graham et al. | Aug. 1, 1905 |
| 1,163,170 | Pearson | Dec. 7, 1915 |
| 1,753,300 | Peterson | Apr. 8, 1930 |
| 1,912,493 | Nanstiel | June 6, 1933 |